US012701648B1

(12) United States Patent
Günther et al.

(10) Patent No.: US 12,701,648 B1
(45) Date of Patent: Aug. 4, 2026

(54) ELECTRODE FOR A PLASMA CUTTING TORCH, ASSEMBLY HAVING SAID ELECTRODE, PLASMA CUTTING TORCH HAVING SAID ELECTRODE, AND METHOD FOR PLASMA CUTTING

(71) Applicant: Kjellberg-Stiftung, Finsterwalde (DE)

(72) Inventors: Vadim Günther, Finsterwalde (DE); Frank Laurisch, Finsterwalde (DE); Volker Krink, Finsterwalde (DE)

(73) Assignee: Kjellberg-Stiftung, Finsterwalde (DE)

( * ) Notice: Subject to any disclaimer, the term of this patent is extended or adjusted under 35 U.S.C. 154(b) by 696 days.

(21) Appl. No.: 18/040,752

(22) PCT Filed: Jul. 29, 2021

(86) PCT No.: PCT/DE2021/100652
§ 371 (c)(1),
(2) Date: Feb. 6, 2023

(87) PCT Pub. No.: WO2022/028648
PCT Pub. Date: Feb. 10, 2022

(30) Foreign Application Priority Data

Aug. 5, 2020 (DE) ......................... 102020120676.3
Sep. 25, 2020 (DE) ......................... 102020125073.8

(51) Int. Cl.
*H05H 1/28* (2006.01)

(52) U.S. Cl.
CPC .................................... *H05H 1/28* (2013.01)

(58) Field of Classification Search
CPC ........................................................ H05H 1/28
See application file for complete search history.

(56) References Cited

U.S. PATENT DOCUMENTS

| | | | | |
|---|---|---|---|---|
| 2,922,028 | A * | 1/1960 | Butler | B23K 35/0205 219/146.21 |
| 2004/0211760 | A1 * | 10/2004 | Delzenne | B23K 10/00 219/121.51 |
| 2017/0086284 | A1 | 3/2017 | Carabin et al. | |
| 2019/0306965 | A1 * | 10/2019 | Rao | H05H 1/28 |

FOREIGN PATENT DOCUMENTS

| | | | |
|---|---|---|---|
| EP | 0727922 | B1 | 6/1999 |
| EP | 2008750 | B1 | 12/2008 |
| EP | 3174373 | A1 | 5/2017 |
| FR | 2928287 | A1 | 9/2009 |
| SU | 421458 | A1 | 3/1974 |

* cited by examiner

*Primary Examiner* — Robert G Bachner
(74) *Attorney, Agent, or Firm* — Jonathan M. D'Silva; MMI Intellectual Property

(57) ABSTRACT

The invention relates to an electrode for a plasma cutting torch, comprising an electrode holder and an emission insert, which are frictionally, interlockingly and/or integrally joined to each other, characterized in that the emission insert is made of an alloy at least of tungsten and at least one of the following elements or compounds: zirconium and/or hafnium and/or zirconium oxide and/or hafnium oxide; to an assembly having said electrode; to a plasma cutting torch having said electrode; and to a method for plasma cutting.

17 Claims, 7 Drawing Sheets

ELECTRODE FOR A PLASMA CUTTING TORCH, ASSEMBLY HAVING SAID ELECTRODE, PLASMA CUTTING TORCH HAVING SAID ELECTRODE, AND METHOD FOR PLASMA CUTTING

BACKGROUND

The invention relates to electrodes for a plasma cutting torch, in particular a liquid-cooled plasma cutting torch, and to arrangements, in particular liquid-cooled arrangements, having the same, to plasma cutting torches having the same, and to methods for plasma cutting.

Plasma cutting torches are used for the plasma cutting of metals. They conventionally consist substantially of a torch body, an electrode, a nozzle and a support for the latter. Modern plasma torches and plasma cutting torches additionally have a nozzle protection cap fitted over the nozzle. Often, a nozzle is fixed by means of a nozzle cap.

The components which experience wear as a result of the high thermal stress caused by the arc during operation of the plasma cutting torch are, depending on the type of plasma cutting torch, in particular the electrode, the nozzle, the nozzle cap, the nozzle protection cap, the nozzle protection cap support and the parts guiding the plasma gas and the secondary gas. These components may easily be replaced by an operator and are therefore referred to as wearing parts.

Plasma cutting torches are connected via lines to an electrical power source and a gas supply, which supply the plasma cutting torch. The plasma cutting torch may furthermore be connected to a cooling device for a coolant, for example a cooling liquid.

High thermal stresses occur in plasma cutting torches. This is caused by the great constriction of the plasma jet by the nozzle bore. In this case, small bores are used so that high current densities of from 50 to 150 $A/mm^2$ in the nozzle bore, high energy densities of about $2\times10^6$ $W/cm^2$ and high temperatures of up to 30000 K are generated. Relatively high gas pressures, generally up to 12 bar, are furthermore used in plasma cutting torches. The combination of high temperature and high kinetic energy of the plasma gas flowing through the nozzle bore leads to melting of the workpiece and expulsion of the molten material. This creates a kerf, and the workpiece is separated.

During plasma cutting, nitrogen or gas mixtures containing nitrogen are often used as plasma gas in order to cut high-alloy steel, stainless steel, nonferrous metals or nonferrous metal alloys, for example aluminum or an aluminum-magnesium alloy. With nitrogen or gas mixtures containing nitrogen, it is however also possible to cut low-alloy or unalloyed steels, that is to say so-called mild steels.

A plasma gas flows between the electrode and the nozzle. The plasma gas is guided through a gas guide part (plasma gas guide part). The plasma gas may thereby be directed in a controlled way. Often, it is set in rotation about the electrode by a radial and/or axial offset of the openings in the plasma gas guide part. The plasma gas guide part consists of electrically insulating material since the electrode and the nozzle must be electrically insulated from one another. This is necessary since the electrode and the nozzle have different electrical potentials during operation of the plasma cutting torch. In order to operate the plasma cutting torch, an arc which ionizes the plasma gas is generated between the electrode and the nozzle and/or the workpiece. In order to ignite the arc, a high voltage which ensures preionization of the path between the electrode and the nozzle, and therefore the formation of an arc, may be applied between the electrode and the nozzle. The arc burning between the electrode and the nozzle is also referred to as a pilot arc.

The pilot arc emerges through the nozzle bore, impinges on the workpiece and ionizes the path to the workpiece. In this way, the arc can be formed between the electrode and the workpiece. This arc is also referred to as the main arc. During the main arc, the pilot arc may be turned off. It may, however, also continue to be operated. In plasma cutting, it is often turned off so as not to stress the nozzle even more.

In particular, the electrode and the nozzle are heated greatly and need to be cooled. At the same time, they must also conduct the electrical current which is required for the formation of the arc. Substances with high thermal and electrical conductivity, generally metals, for example copper, silver, aluminum, tin, zinc, iron, or alloys which contain at least one of these metals, are therefore used for them.

The electrode often consists of an electrode holder and an emission insert, which is made from a substance which has a high melting temperature (>3000° C.). As materials for the emission insert, tungsten is used when employing non-oxidizing plasma gases, for example argon, hydrogen, nitrogen, helium and mixtures thereof. The refractory substance may be pressed, for example with a form and/or force fit, into an electrode holder which consists of a highly thermally and electrically conductive substance.

The cooling of the electrode and the nozzle may be carried out using a gas, for example the plasma gas or a secondary gas which flows along the outer side of the nozzle. Cooling with a liquid, for example water, is however more effective. The electrode and/or the nozzle are in this case often cooled directly with the liquid, that is to say the liquid is in direct contact with the electrode and/or the nozzle. In order to guide the cooling liquid around the nozzle, there is a nozzle cap around the nozzle, the inner face of which forms, with the outer face of the nozzle, a coolant space in which the coolant flows.

In modern plasma cutting torches, there is additionally a nozzle protection cap outside the nozzle and/or the nozzle cap. The inner face of the nozzle protection cap and the outer face of the nozzle, or of the nozzle cap, form a space through which a secondary or shield gas flows. The secondary or shield gas emerges from the bore in the nozzle protection cap, encloses the plasma jet and ensures a defined atmosphere around the latter. In addition, the secondary gas protects the nozzle and the nozzle protection cap against arcs which may be formed between it and the workpiece. These are referred to as double arcs and may cause damage to the nozzle. Particularly when penetrating into the workpiece, the nozzle and the nozzle protection cap are greatly exposed to hot sprayback of material. The secondary gas, the flow rate of which may be increased greatly during penetration compared with the value during cutting, keeps the material sprayed back away from the nozzle and the nozzle protection cap, and thus protects against damage.

The nozzle protection cap is likewise heated greatly and needs to be cooled. Substances with high thermal and electrical conductivity, generally metals, for example copper, silver, aluminum, tin, zinc, iron, or alloys which contain at least one of these metals, are therefore used for it.

The electrode and the nozzle may also be cooled indirectly. They are in this case in touching contact with a component which consists of a substance with high thermal and electrical conductivity, generally a metal, for example copper, silver, aluminum, tin, zinc, iron, or alloys which contain at least one of these metals. This component is in turn cooled directly, that is to say it is directly in contact with the coolant, which is usually a flowing coolant. These components may at the same time be used as a support or socket for the electrode, the nozzle, the nozzle cap or the nozzle protection cap, and dissipate the heat and supply the current.

There is also the possibility that only the electrode or only the nozzle is cooled with liquid.

The nozzle protection cap is usually cooled only by the secondary gas. Arrangements in which the secondary gas cap is cooled directly or indirectly by a cooling liquid are also known.

In plasma torches, and particularly in plasma cutting torches, a great stress on the wearing components occurs because of the high energy density and the high temperatures. This also pertains, in particular, to the electrode.

The previously known solutions for the electrode, namely to place the emission insert consisting of high-melting material, for example tungsten, in a highly thermally conductive material, for example copper or silver, often achieve insufficient outcomes in respect of the lifetime and/or cutting quality.

Particularly when using nitrogen or gas mixtures containing nitrogen as plasma gas, the lifetime is often too short. Furthermore, there are often large variations in the lifetime.

A high cutting quality and cutting speed is achieved in the cutting of high-alloy steel, stainless steel, nonferrous metals or nonferrous metal alloys by the use of so-called pointed electrodes. In this case, the emission insert projects from the electrode holder and is configured to be pointed at the front. During cutting with an argon-hydrogen mixture, a good lifetime and a good cutting quality are in this case also achieved for workpiece thicknesses of more than 6 mm.

For smaller workpiece thicknesses, greater perpendicularity and inclination tolerances according to DIN ISO 9013 occur. Furthermore, increased burring occurs on the lower edge of the workpiece.

The cutting quality may be improved by the use of nitrogen, argon-nitrogen, nitrogen-hydrogen or argon-hydrogen-nitrogen mixtures. However, the lifetime of the electrode is reduced significantly, even for plasma cutting with relatively low currents of less than 100 A.

The emission insert wears during operation, that is to say in the presence of a burning arc or plasma jet. It gradually burns back and the part projecting from the electrode holder becomes shorter. With increasing burn-back, the cutting quality deteriorates significantly. Particularly when cutting high-alloy steel, stainless steel, nonferrous metals or nonferrous metal alloys, this in turn leads to a greater perpendicularity and inclination tolerance of the cut face according to DIN ISO 9013, the formation of burrs on the lower side of the material to be cut, and greater roughness of the cut face.

If it is burnt back to more than 1 mm, the cutting quality is usually no longer acceptable. If it burns back even further, for example beyond 2 mm, displacement of the arc from the emission insert to the electrode holder and abrupt failure of the entire electrode take place. Destruction of the nozzle also occurs in this case. The entire torch may even be destroyed.

It is known to dope tungsten electrodes with rare earth oxides in order to increase their lifetime and improve the ignitability of the arc. These are for example lanthanum, thorium or cerium oxide. This is known for applications with the use of argon as gas. If such electrodes are used with nitrogen, the lifetime decreases rapidly.

It is also known to use so-called flat electrodes, in which the emission insert does not project from the electrode holder. In this case, an improvement in the lifetime is achieved. However, the cutting speed and the cutting quality when cutting high-alloy steel, stainless steel, nonferrous metals or nonferrous metal alloys are reduced significantly. The longer lifetime is achieved by the better cooling of the emission insert, since it is inserted into the electrode holder as far as the starting point of the arc, that is to say its front end. The inferior cutting quality is presumably caused by the different or even inferior flow conditions for the plasma gas, which result from a so-called flat electrode in combination with a nozzle.

SUMMARY

The object of the invention is to achieve a high cutting speed, a high cutting quality and a long lifetime at least of the electrode during plasma cutting.

According to the invention, this object is achieved according to a first aspect by an electrode for a plasma cutting torch, comprising an electrode holder and an emission insert which are connected to one another with a force fit, form fit and/or by material bonding, characterized in that the emission insert consists of an alloy at least of tungsten and at least one of the following elements or compounds: zirconium and/or hafnium and/or zirconium oxide and/or hafnium oxide.

According to a second aspect, this object is also achieved by an electrode for a plasma cutting torch, wherein the electrode has a front end and a rear end, extends along a longitudinal axis, and has at least one emission insert at the front end as well as an electrode holder, in particular wherein at least a part of the emission insert protrudes or projects from the electrode holder in the direction of the front end of the electrode, in particular wherein the emission insert protruding or projecting from the electrode holder has a section tapering, preferably conically, in the direction of the front end.

According to a third aspect, this object is furthermore achieved by an arrangement consisting of an electrode as claimed and a nozzle.

According to a fourth aspect, this object is additionally achieved by a plasma cutting torch comprising an electrode as claimed, a nozzle and/or a nozzle protection cap and/or a plasma gas guide part.

Furthermore, according to a fifth aspect, this object is achieved by a method for plasma cutting by using a plasma cutting torch as claimed, wherein the plasma cutting torch (1) is operated with nitrogen or a gas mixture of nitrogen as plasma gas.

Favorably, in the electrode according to the first and second aspects, the proportion of zirconium and/or hafnium and/or zirconium oxide and/or hafnium oxide is at least 0.1%, preferably at least 0.3%, of the volume or the mass of the alloy of the emission insert.

Favorably, the proportion of zirconium and/or hafnium and/or zirconium oxide and/or hafnium oxide is at most 5%, preferably at most 2% of the volume or the mass of the alloy of the emission insert.

Advantageously, the proportion of tungsten is at least 95%, preferably at least 98%, most preferably 99% of the volume or the mass of the alloy of the emission insert.

Furthermore, the remaining proportion of the alloy of the emission insert to make up 100% of the volume or the mass may be formed to at least 20%, preferably at least 25%, more preferably at least 30% from copper and/or silver.

In one particular embodiment, the electrode has a front end and a rear end and extends along a longitudinal axis L, and the emission insert is located at the front end.

Furthermore, a part of the emission insert may protrude or project from the electrode holder in the direction of the front end of the electrode.

In particular, the emission insert protruding or projecting from the electrode holder may in this case have a section tapering, preferably conically, in the direction of the front end.

Favorably, an outer face, extending toward the front end along the longitudinal axis L, of the section tapering, preferably conically, forms an angle (B) of from 15° to 30°, preferably from 20° to 25°, between the outer face and the longitudinal axis L.

The electrode holder may have a section tapering, preferably conically, toward the front end.

Expediently, an outer face, extending toward the front end along the longitudinal axis L, of the section tapering, preferably conically, forms an angle $\alpha$ of from 15° to 30°, preferably from 20° to 25°, between the outer face and the longitudinal axis L.

Favorably, the angles $\alpha$ and $\beta$ have a difference of at most 10°, preferably at most 5°, and are most preferably equal.

Favorably, the emission insert has a circular face at the front end of the electrode, which has a diameter D3 of at most 1.5 mm, preferably at most 1.0 mm, most preferably at most 0.6 mm.

Advantageously, the emission insert has a circular face at the front end of the electrode, which has a diameter D3 of at least 0.2 mm, preferably at least 0.4 mm.

The face at the front end of the electrode may, however, also be other than circular. Regardless of whether or not it is circular, it is advantageously at most 1.8 $mm^2$, preferably at most 0.8 $mm^2$, most preferably at most 0.3 $mm^2$ in size and/or at least 0.05 $mm^2$, preferably at least 0.1 $mm^2$ in size.

In one particular embodiment, the emission insert has a greatest outer diameter D2 and the electrode holder has a smallest outer diameter D1, the difference between D1 and D2 lying between 0.2 mm and 1 mm.

In the electrode according to the second aspect, an outer face, extending toward the front end along the longitudinal axis L, of the section tapering, preferably conically, may form an angle $\beta$ of from 15° to 30°, preferably from 20° to 25°, between the outer face and the longitudinal axis L.

The electrode holder may have a section tapering, preferably conically, toward the front end.

Advantageously, an outer face, extending toward the front end along the longitudinal axis L, of the section tapering, preferably conically, forms an angle $\alpha$ of from 15° to 30°, preferably from 20° to 25°, between the outer face and the longitudinal axis L.

The angles $\alpha$ and $\beta$ may have a difference of at most 10°, preferably at most 5°, and are most preferably equal.

The emission insert may have a circular face at the front end of the electrode, which has a diameter D3 of at most 1.5 mm, preferably at most 1.0 mm, most preferably at most 0.6 mm.

The emission insert may have a circular face at the front end of the electrode, which has a diameter D3 of at least 0.2 mm, preferably at least 0.4 mm.

The face at the front end of the electrode may, however, also be other than circular. Regardless of whether or not it is circular, it is advantageously at most 1.8 $mm^2$, preferably at most 0.8 $mm^2$, most preferably at most 0.3 $mm^2$ in size and/or at least 0.05 $mm^2$, preferably at least 0.1 $mm^2$ in size.

The emission insert may have a greatest outer diameter D2 and the electrode holder may have a smallest outer diameter D1, the difference between D1 and D2 lying between 0.2 mm and 1 mm.

In the arrangement according to the third aspect, the angles between the outer face (7.1.3) of the conical section (7.1.1) of the electrode (7) and the longitudinal axis (L) and between the inner face of the nozzle (4), lying opposite the outer face, and the longitudinal axis (L) may have a difference of at most 10°, preferably at most 5°, and may more preferably be equal.

According to one particular embodiment, for a distance L1 between the front end (14) of the electrode and a rear end of the nozzle channel (4.1) of the nozzle (4): L1≤1.5 mm, preferably L1≤1 mm and/or L1≤1.5*D4, preferably L1≤1.0*D4, with D4 being the smallest diameter of the nozzle channel.

In the plasma cutting torch according to the fourth aspect, the angles between the outer face of the conical section of the electrode and the longitudinal axis L and between the inner face of the nozzle, lying opposite the outer face, and the longitudinal axis L may have a difference of at most 10°, preferably at most 5°, and may more preferably be equal.

In the plasma cutting torch, it may be provided that for a distance L1 between the front end of the electrode and a rear end of the nozzle channel: L1≤1.5 mm, preferably L1≤1 mm and/or L1≤1.5*D4, preferably L1≤1.0*D4, with D4 being the smallest diameter of the nozzle channel.

In the method according to the fifth aspect, the plasma gas mixture may consist of nitrogen and argon or of nitrogen and hydrogen or of nitrogen and argon and hydrogen.

Advantageously, the plasma cutting torch is operated with nitrogen or a gas mixture with nitrogen or air or a gas mixture with air as secondary gas.

Favorably, the secondary gas mixture consists of nitrogen and argon or of nitrogen and hydrogen or of nitrogen and argon and hydrogen or of air and argon or of air and nitrogen.

Advantageously, at least 30%, preferably 50% and most preferably 75% of the volume of the plasma gas and/or of the secondary gas consist of nitrogen or air.

Favorably, at least the electrode and/or the nozzle and/or the nozzle protection cap is/are cooled with a liquid medium.

The workpiece to be cut may consist of a high-alloy steel, a stainless steel or a nonferrous metal or a nonferrous metal alloy.

The nonferrous metal may consist at least partially of aluminum, copper, titanium, zinc or tin.

The present invention is based on the surprising discovery that, by the materials used and/or the design configuration of the electrode, a long lifetime and a high cutting quality is achieved over a long period of time even when using a plasma gas or gas mixture containing nitrogen in a plasma torch, in particular when cutting high-alloy steel, stainless steel or a nonferrous metal/nonferrous metal alloy.

BRIEF DESCRIPTION OF DRAWINGS

Further features and advantages of the invention may be found in the appended claims and the description below, in which several exemplary embodiments are explained in detail with the aid of schematic drawings, in which:

DETAILED DESCRIPTION

Figure 1:
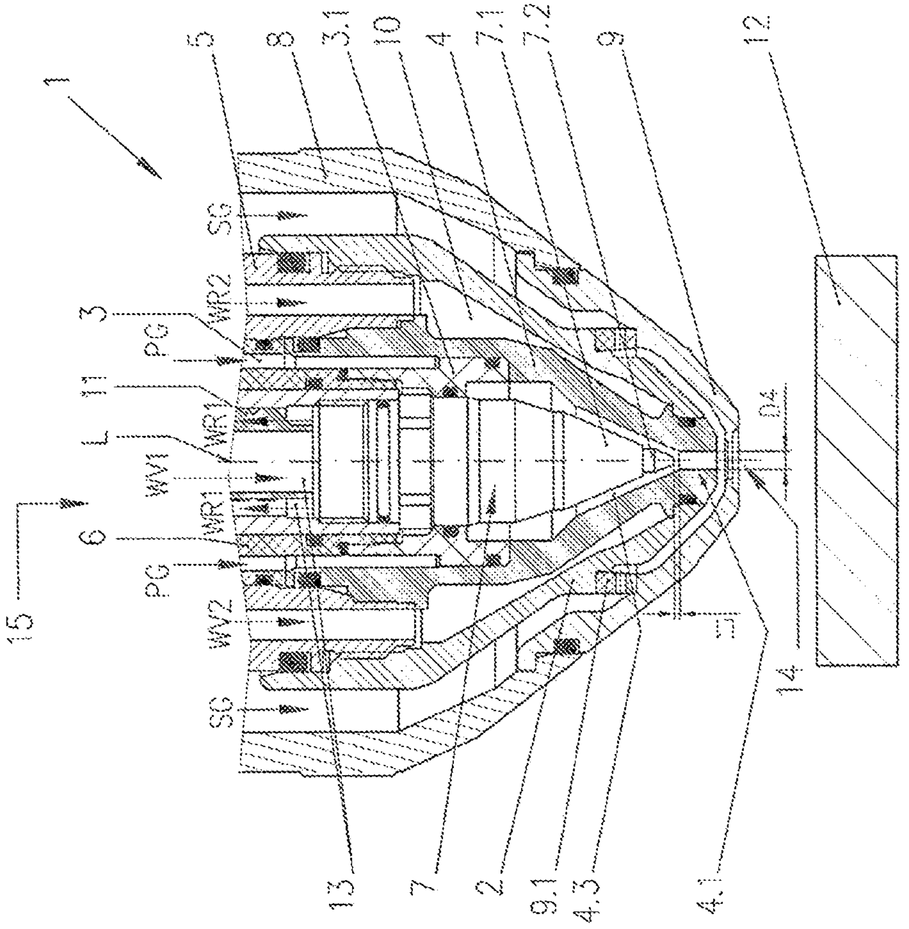
FIG. 1 shows a sectional representation through a plasma cutting torch head of a plasma torch according to one particular embodiment of the present invention.
Figure 2:
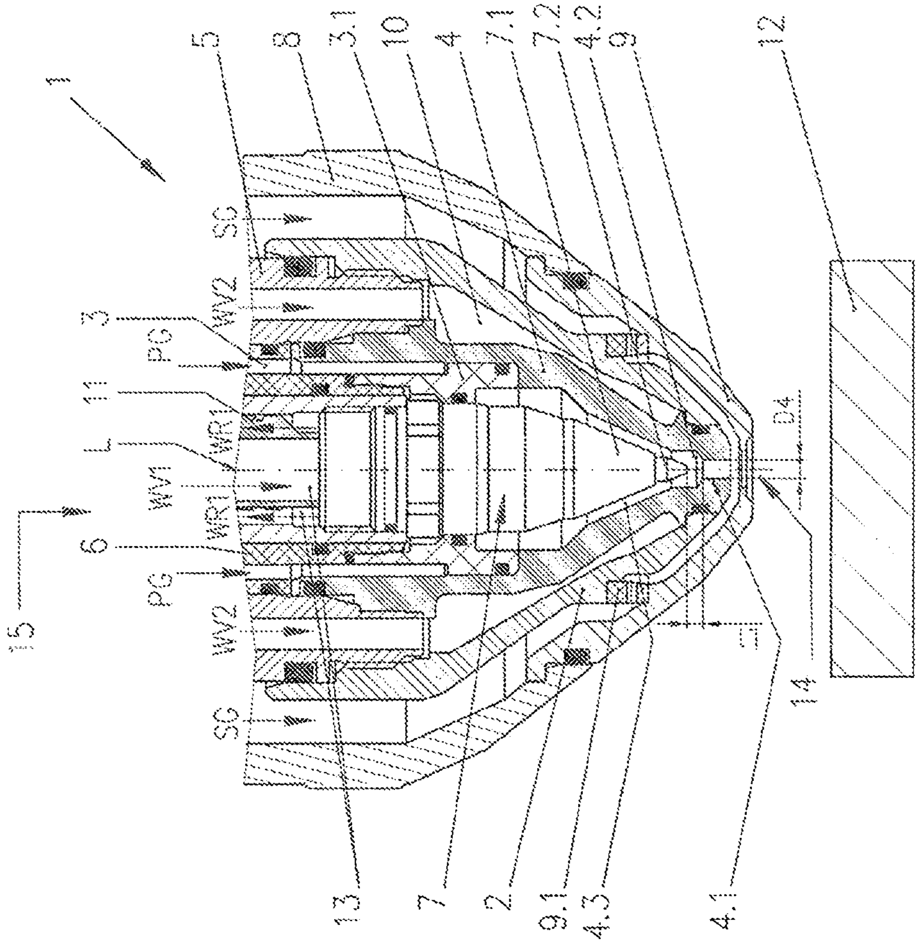
FIG. 2 shows a sectional representation through a plasma cutting torch head of a plasma torch according to a further particular embodiment of the present invention.

FIGS. 1 and 2 show sectional representations through plasma cutting torch heads according to particular embodiments of the present invention, in which an electrode according to one particular embodiment of the present invention and an arrangement consisting of an electrode and a nozzle according to one particular embodiment of the present invention have been used.

Figure 3:
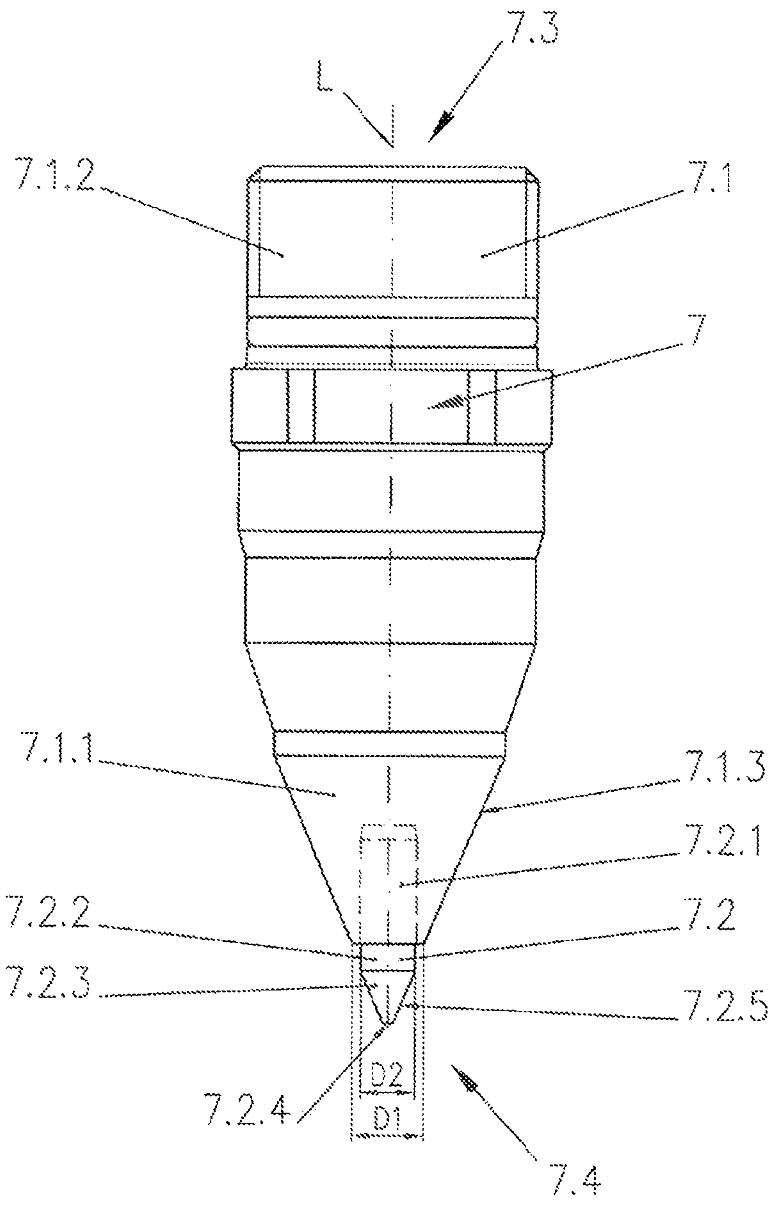
FIG. 3 shows a detailed representation of the electrode contained in FIGS. 1 and 2 in a side view.
Figure 4:
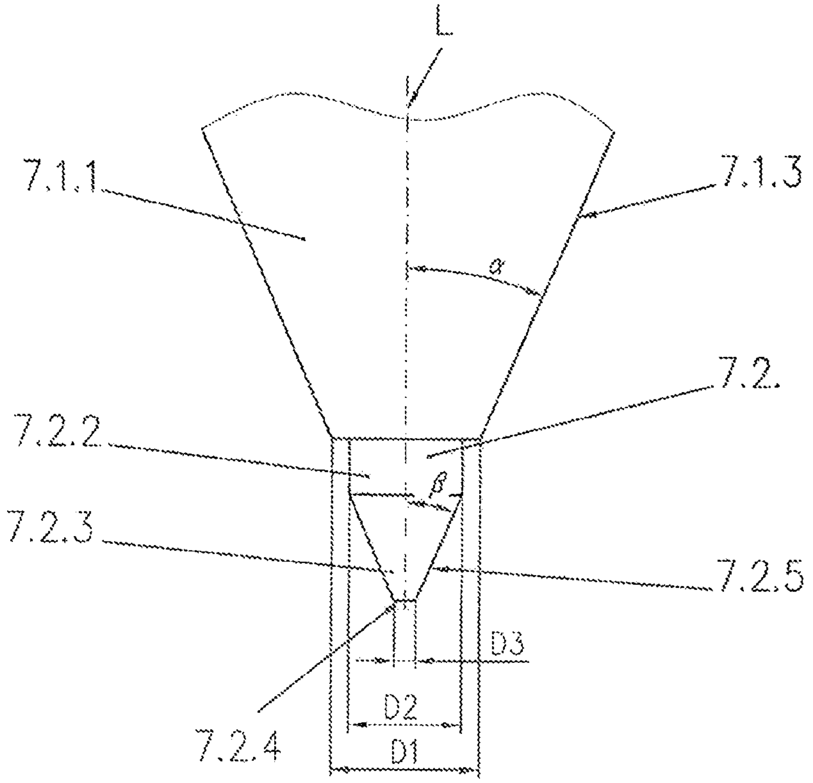
FIG. 4 shows a detail view of FIG. 3.
Figure 5:
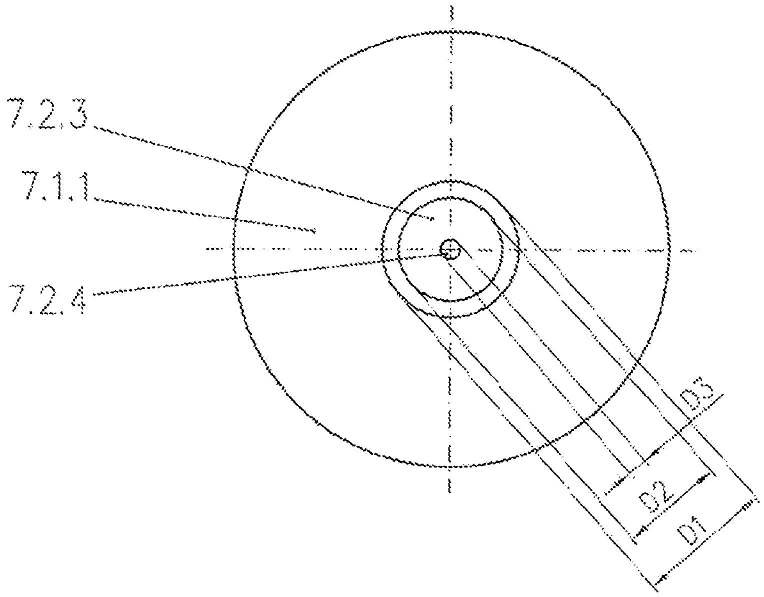
FIG. 5 shows a view from below of the electrode shown in FIG. 3.

FIGS. 3, 4 and 5 show details of the electrode contained in the plasma cutting torch heads of FIGS. 1 and 2.

Figure 6:
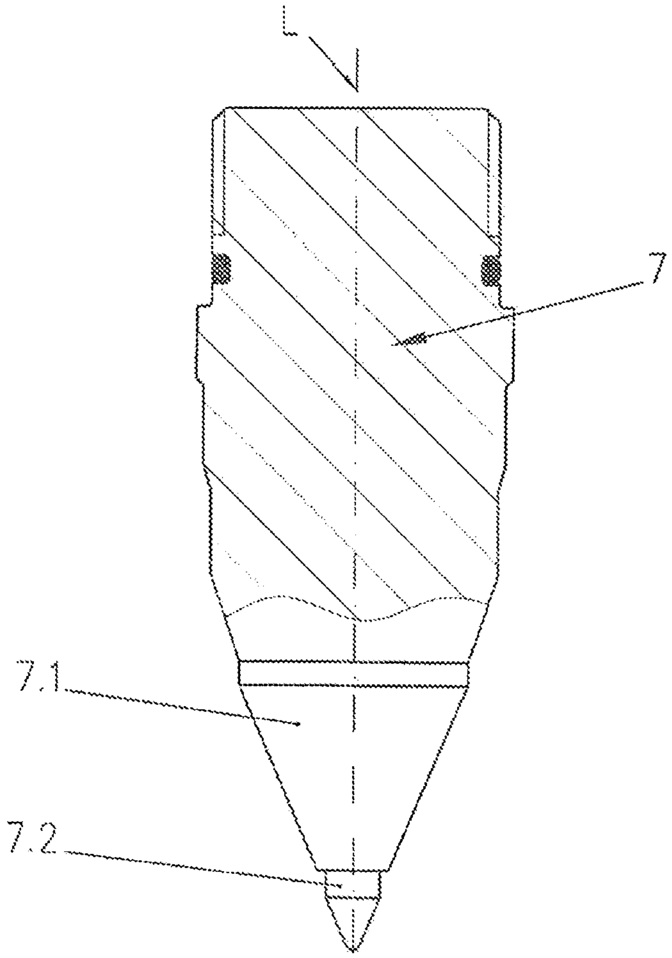
FIG. 6 shows a partial sectional view of an electrode according to one particular embodiment of the present invention.
Figure 7:
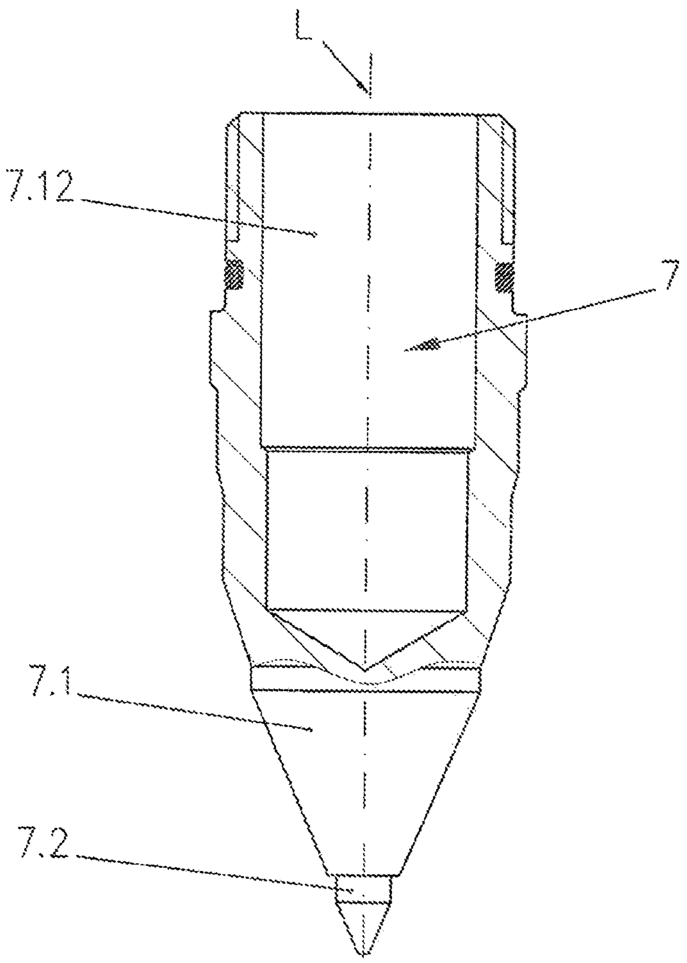
FIG. 7 shows a partial sectional view of the electrode shown in 1, 2 and 3 to 5.

FIG. 6 shows a sectional view of an electrode according to a further particular embodiment of the invention, and FIG. 7 shows a sectional view of the electrode shown in FIGS. 1, 2 and 3 to 5.

The plasma cutting torch head 1 shown in FIG. 1 has an electrode 7, a nozzle 4, and a plasma gas delivery 3 for plasma gas PG. The plasma cutting torch head according to one particular embodiment of the present invention extends along the longitudinal axis L and has a front end 14 and a rear end 15.

The electrode 7 is screwed into an electrode socket 6 by means of a screw thread and is cooled internally by a coolant which is delivered through the interior of a cooling tube 11 as a coolant feed WV1 and is returned through a space 13 formed between the exterior of the cooling tube 11 and the electrode socket 6 as a coolant return WR1.

The nozzle 4 is held by a nozzle cap 2. Between the nozzle 4 and the nozzle cap 2, a coolant which is delivered through the coolant feed WV2 and is returned through the coolant return WR2 flows in a space 10.

A nozzle protection cap 9 encloses the nozzle 4 and the nozzle cap 2. In between, secondary gas SG flows through a secondary gas guide 9.1, which at the same time insulates and separates the nozzle protection cap 9 from the nozzle cap 2. In this case, the secondary gas guide 9.1 may for example be configured so that the secondary gas SG can be rotated. The nozzle protection cap 9 is fixed by a nozzle protection cap support 8, which is fastened on the plasma torch head by means of a screw thread.

In its interior, as seen from the front end 14, the nozzle 4 has a nozzle channel 4.1 and a conically widening space 4.3. The inner face of the space 4.2 of the nozzle 4 runs parallel to a conical outer face 7.1.3 of a section 7.1.1 of the electrode 7. A good plasma gas flow is thus achieved in the remaining space between the nozzle 4 and the electrode 7. Owing to the pointed design of the electrode 7, the front circular face of the emission insert 7.2 comes very close to the end of the nozzle channel 4.1. Thus, by way of example, the distance L1 between the electrode and the rear end of the nozzle channel 4.1 is 0.8 mm in FIG. 1, and in FIG. 2 by way of example L1=1.2 mm. The diameter D4 of the nozzle channel 4.1 is by way of example 1.2 mm in both figures. The front face 7.2.4 of the emission insert may moreover also be other than circular. Regardless of whether or not it is circular, it is advantageously at most 1.8 $mm^2$, preferably at most 0.8 $mm^2$, most preferably at most 0.3 $mm^2$ in size and/or at least 0.05 $mm^2$, preferably at least 0.1 $mm^2$ in size.

"Very close" is generally intended to mean the following: L1≤1.5 mm, preferably L1≤1 mm and/or L1≤1.5*D4, preferably L1≤1.0*D4, with D4 the smallest diameter of the nozzle channel.

A plasma gas guide part 3.1, which insulates the electrode 7 and the nozzle 4 from one another and lets the plasma gas PG flow through openings into the nozzle interior, is fitted between the electrode 7 and the nozzle 4. In this case, the plasma gas PG is set in rotation by a radial offset of the openings with respect to the longitudinal axis L or by inclination of the openings with respect to the longitudinal axis L.

The electrode 7 consists of an electrode holder 7.1 and an emission insert 7.2. In one embodiment, however, it may also consist of more constituent parts. The emission insert 7.2 is fastened in the electrode holder 7.1. This may be done by means of a force fit, form fit and/or by material bonding. A good thermal junction is thus achieved between the emission insert 7.2 and the electrode holder 7.1. The electrode holder 7.1 may be water-cooled, in which case it may have in the interior a cavity through which the coolant flows. The electrode holder 7.1 consists of a material with high thermal and electrical conductivity, for example copper or silver or an alloy thereof. For the emission insert 7.2, an alloy such as is specified in one of claims 1 to 5 may be used.

Advantageously, the thermal conductivity is >300W/(m*K), for example silver 429W/(m*K), copper 398W/(m*K). As an alternative or in addition, the electrical conductivity is advantageously more than 107 S/m (for example silver $61*10^6$ S/m, copper $58*10^6$ S/m).

In this example, an alloy of tungsten and zirconium oxide is used. The proportion of tungsten is in this case by way of example 99.3% and that of zirconium oxide 0.3% of the mass of the alloy. The missing proportion to make up 100% of the mass consists in this example of copper with a proportion of 0.15% in relation to the total mass.

The plasma cutting torch head 1 shown in FIG. 2 differs from the plasma cutting torch head shown in FIG. 1 in the inner contour of the nozzle. In its interior, as seen from the front end 14, the nozzle 4 has a cylindrical nozzle channel 4.1, a further substantially cylindrical space 4.2 and a conically widening space 4.3. Substantially cylindrical means that the cylindrical inner face of this space 4.3 is larger than the inner face of the smaller conically configured section shown here directly at the nozzle channel 4.1. The inner face of the space 4.3 of the nozzle 4 runs parallel to the outer face 7.1.3 of the section 7.1.1 of the electrode 7. A good plasma gas flow is thus achieved in the remaining space between the nozzle 4 and the electrode 7. Owing to the pointed design of the electrode 7, the emission insert 7.2 projects into the space 4.2. The front circular face 7.2.4 of the emission insert 7.2 comes very close to the end of the nozzle channel 4.1. The length L1 is in this case by way of example 1.2 mm. The diameter D4 of the nozzle channel 4.1 is by way of example 1.2 mm.

The front face 7.2.4 of the emission insert may moreover also be other than circular. Regardless of whether or not it is circular, it is advantageously at most 1.8 $mm^2$, preferably at most 0.8 $mm^2$, most preferably at most 0.3 $mm^2$ in size and/or at least 0.05 $mm^2$, preferably at least 0.1 $mm^2$ in size.

FIGS. 3, 4 and 5 show the structure of the electrode of FIGS. 1 and 2 in more detail. FIGS. 3, 4 and 5 show the electrode 7, which extends along a longitudinal axis L and has a front end 7.4 and a rear end 7.3.

The electrode consists of the electrode holder 7.1 and the emission insert 7.2, which in this case by way of example is pressed with its rear section 7.2.1 into the electrode holder 7.1 and is therefore connected with a force fit.

The electrode holder 7.1 has a rear section 7.1.2, which in this case by way of example is configured with a screw thread and can be screwed into the electrode socket 6 of the plasma cutting torch head. The electrode holder 7.2, has toward the front end 7.4 of the electrode 7, a conically tapering section 7.1.1 having an outer face 7.1.3. At the front end, there is a circular face with a diameter D1. An angle α included between the outer face 7.1.3 of the conical section 7.1.1 of the electrode holder 7.1 and the longitudinal axis L is in this case by way of example 23°.

The emission insert 7.2 has a rear section 7.2.1 projecting into the electrode holder 7.1 and a section which projects from the electrode holder 7.1 and has a cylindrical section 7.2.2 with a diameter D2 and a conically tapering section 7.2.3 with an outer face 7.2.5.

The diameter D1 is by way of example 2.0 mm. The diameter D1 is by way of example 2.5 mm. The difference between D1 and D2 is 0.25 mm.

The effect achieved by the small difference is that plasma gas PG flowing in the space between the nozzle 4 and the electrode 7 (as represented in FIGS. 1 and 2) is perturbed as little as possible and flows as uniformly and homogeneously as possible. This ensures a good cutting quality.

Toward the front end 14, furthermore, the emission insert 7.2 has a circular face 7.2.4 which has a diameter D3 of for example 0.4 mm (see FIG. 4). An angle β included from the outer face 7.2.5 of the conical section 7.2.3 of the emission insert 7.2 to the longitudinal axis L is in this case by way of example 23°. In this exemplary embodiment, the angles α and β of the conically tapering sections of the electrode holder 7.1 and of the emission insert 7.2 are equal. The effect achieved by the equality of the angles α and β is that the plasma gas PG flowing in the space between the nozzle 4 and the electrode 7 (as represented in FIGS. 1 and 2) flows as uniformly and homogeneously as possible. This ensures a good cutting quality.

The front face 7.2.4 of the emission insert may moreover also be other than circular. Regardless of whether or not it is circular, it is advantageously at most 1.8 $mm^2$, preferably at most 0.8 $mm^2$, most preferably at most 0.3 $mm^2$ in size and/or at least 0.05 $mm^2$, preferably at least 0.1 $mm^2$ in size.

The diameter D3 is in this case by way of example 0.4 mm. The effect achieved by this is that the lifetime of the electrode is sufficiently long even during plasma cutting with a plasma gas containing nitrogen, and at the same time it remains sufficiently centered owing to the relatively small circular face 7.2.4. Thus, a long lifetime and at the same time a good cutting quality are achieved. Since the diameter D3 is 0.4 mm in this example, the circular face 7.2.4 is therefore 0.125 $mm^2$.

FIG. 6 shows an electrode 7 which differs from the embodiments shown in FIGS. 3 to 5 in that the interior is configured solidly by way of example.

FIG. 7 again shows the electrode of FIG. 1. In the interior, the electrode has a cavity 7.12 which extends from the rear end 7.3 in the direction of the front end. In this case, the cooling is substantially more effective than in an electrode according to FIG. 6 because the coolant is guided, as described in FIGS. 1 and 2, through a cooling tube into the vicinity of the emission insert. The lifetime of the electrode, in particular that of the emission insert, is therefore likewise increased.

The described electrodes 7 and the described plasma cutting torch 1 according to the invention are used for plasma cutting with a plasma gas containing nitrogen. This is particularly advantageous for the plasma cutting of workpieces which consist of a high-alloy steel, a stainless steel or a nonferrous metal or a nonferrous metal alloy. It is, however, also possible to cut mild steel.

In this case, by the use of an electrode 7 having an electrode holder 7.1 and an emission insert 7.2, a long lifetime and a good cutting quality are achieved.

The features of the invention which are disclosed in the description above, in the drawings and in the claims may be essential either individually or in any desired combinations for the implementation of the invention in its various embodiments.

LIST OF REFERENCES

1 plasma cutting torch head
2 nozzle cap
3 plasma gas delivery
3.1 plasma gas guide part
4 nozzle
4.1 nozzle channel
4.2 space
4.3 space
5 nozzle support
6 electrode socket
7 electrode
7.1 electrode holder
7.1.1 tapering section of the electrode holder
7.1.2 rear section of the electrode holder
7.1.3 outer face of the tapering section of the electrode holder
7.2 emission insert
7.2.1 rear section, located in the electrode holder, of the emission insert 7.2
7.2.2 part of the emission insert 7.2 projecting from the electrode holder
7.2.3 tapering section of the emission insert
7.2.4 circular face of the emission insert
7.2.5 outer face of the tapering section of the emission insert
7.3 rear end of the electrode
7.4 front end of the electrode
7.12 cavity
8 nozzle protection cap support
9 nozzle protection cap
9.1 secondary gas guide part
10 space
11 cooling tube
12 workpiece
13 space
14 front end
15 rear end
D1 smallest diameter of the front end of the electrode holder 7.1
D2 diameter of the part of the emission insert 7.2 protruding from the electrode holder
D3 smallest diameter of the front end of the emission insert 7.2
D4 smallest diameter of the nozzle channel
L longitudinal axis of the plasma torch head 1 and of the electrode 7
L1 electrode-rear end of nozzle channel distance
PG plasma gas
SG secondary gas
WV1, WV2 coolant feeds
WR1, WR2 coolant returns
α angle between outer face 7.1.3 of the electrode holder and the longitudinal axis L β angle between outer face 7.2.5 of the emission insert and the longitudinal axis L

The invention claimed is:

1. An electrode for a plasma cutting torch, comprising:

an electrode holder and an emission insert which are connected to one another with one of a force fit, form fit and by material bonding;

said emission insert consists of an alloy at least of tungsten and at least one of zirconium, hafnium, zirconium oxide, and hafnium oxide; and the remaining proportion of said alloy of said emission insert to make up 100% of the volume or the mass is formed to at least 20% to at least 30% from one of copper, silver, and copper and silver.

2. The electrode of claim 1 further comprising, the proportion of zirconium, hafnium, zirconium oxide, and hafnium oxide is at least 0.1% to at least 0.3% of the volume or the mass of said alloy of said emission insert.

3. The electrode of claim 1 further comprising, the proportion of zirconium, hafnium, zirconium oxide, and hafnium oxide is at most 5% to at most 2% of the volume or the mass of said alloy of said emission insert.

4. The electrode of claim 1 further comprising, the proportion of tungsten is at least 95% to 99% of said alloy of said emission insert.

5. The electrode of claim 1 further comprising, the electrode has a front end and a rear end and extends along a longitudinal axis (L), and said emission insert is located at said front end.

6. The electrode of claim 5 further comprising, at least a part of said emission insert protrudes or projects from said electrode holder in the direction of said front end of the electrode.

7. The electrode of claim 6 further comprising, said emission insert protruding or projecting from said electrode holder has a section tapering in the direction of said front end.

8. The electrode of claim 7 further comprising an outer face, extending toward said front end along said longitudinal axis (L), of said section forms an angle (β) of from 15° to 30° between said outer face and said longitudinal axis (L).

9. The electrode of claim 5 further comprising, said electrode holder has a section tapering toward said front end.

10. The electrode of claim 9 further comprising an outer face, extending toward said front end along said longitudinal axis (L), of said section, forms an angle (α) of from 15° to 30° between said outer face and said longitudinal axis (L).

11. The electrode of claim 10 further comprising, said angles (α) and (β) are equal or have a difference of at most 10° or at most 5°.

12. The electrode of claim 6 further comprising, said emission insert has a circular face at said front end of the electrode, said circular insert has a diameter (D3) of at most 1.5 mm to at most 0.6 mm.

13. The electrode of claim 6 further comprising, said emission insert has a circular face at said front end of the electrode, said circular insert has a diameter (D3) of at least 0.2 mm to at least 0.4 mm.

14. The electrode of claim 6 further comprising, said emission insert has a greatest outer diameter (D2) and said electrode holder has a smallest outer diameter (D1), the difference between (D1) and (D2) lying between 0.2 mm and 1 mm.

15. The electrode of claim 1, further comprising a nozzle.

16. The electrode of claim 1, further comprising:

a nozzle having an inner face; and wherein the angles between said outer face of said section of the electrode and said longitudinal axis (L) and between said inner face of said nozzle, lying opposite said outer face, and said longitudinal axis (L) are equal or have a difference of at most 10° to at most 5°.

17. The electrode of claim 15 further comprising:

said nozzle comprising a nozzle channel; and for a distance L1 between said front end of the electrode and a rear end of said nozzle channel of said nozzle, L1 is one of L1≤1.5 mm, L1≤1.5*D4, and L1≤1.5 mm and L1≤1.5*D4, with D4 being the smallest diameter of said nozzle channel.

* * * * *